United States Patent
Zhang (10) Patent No.: US 11,234,102 B2
(45) Date of Patent: Jan. 25, 2022

(54) METHOD FOR REPORTING DATA AND RELATED PRODUCTS

(71) Applicant: GUANGDONG OPPO MOBILE TELECOMMUNICATIONS CORP., LTD., Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/885,865

(22) Filed: May 28, 2020

(65) Prior Publication Data
US 2020/0296544 A1    Sep. 17, 2020

Related U.S. Application Data

(63) Continuation of application No. PCT/CN2019/071550, filed on Jan. 14, 2019.

(30) Foreign Application Priority Data

Jan. 18, 2018   (CN) .......................... 201810050134.2

(51) Int. Cl.
H04W 4/02    (2018.01)
H04W 4/20    (2018.01)
H04M 1/72454    (2021.01)

(52) U.S. Cl.
CPC ....... *H04W 4/027* (2013.01); *H04M 1/72454* (2021.01); *H04W 4/20* (2013.01); *H04M 2250/12* (2013.01)

(58) Field of Classification Search
CPC ......... H04M 1/72569; H04M 2250/12; H04W 4/027; H04W 4/20; H04W 52/0254; Y02D 30/70
See application file for complete search history.

(56) References Cited

U.S. PATENT DOCUMENTS 8,909,497 B1* 12/2014 Shkolnikov ......... G01P 15/0891
                                                    702/141
2009/0279874 A1* 11/2009 Okada .................. G11B 19/043
                                                    386/222
(Continued)

FOREIGN PATENT DOCUMENTS

CN    101782964 A    7/2010
CN    102098807 A    6/2011
(Continued)

OTHER PUBLICATIONS

International search report issued in corresponding international application No. PCT/CN2019/071550 dated Apr. 16, 2019.

(Continued)

*Primary Examiner* — Nader Bolourchi
(74) *Attorney, Agent, or Firm* — Young Basile Hanlon & MacFarlane, P.C.

(57) ABSTRACT

A method for reporting data and related products are provided. The method is applicable to an electronic device and includes the following. A timer of the electronic device records a continuous weightlessness duration of the electronic device when the electronic device is in a weightlessness state. A fall detection sensor of the electronic device collects falling data of the electronic device in real time when the electronic device is in the weightlessness state. A processor of the electronic device coupled with the timer and the fall detection sensor obtains falling data from the fall detection sensor when the continuous weightlessness duration is longer than a preset duration. A communication module of the electronic device coupled with the processor reports the falling data obtained by the processor to a preset device.

11 Claims, 6 Drawing Sheets

(56) References Cited

U.S. PATENT DOCUMENTS

2013/0138715 A1    5/2013  Petersen
2013/0257582 A1*   10/2013  Rothkopf .............. G06F 1/1656
                                                     340/3.1
2014/0331741 A1    11/2014  Shah et al.

FOREIGN PATENT DOCUMENTS

| CN | 104680088 A | 6/2015 |
| CN | 106412249 A | 2/2017 |
| CN | 106453829 A | 2/2017 |
| CN | 106453832 A | 2/2017 |
| CN | 107395855 A | 11/2017 |
| CN | 108307383 A | 7/2018 |
| JP | 2014215184 A | 11/2014 |
| WO | 2013151871 A1 | 10/2013 |
| WO | 2015117531 A1 | 8/2015 |

OTHER PUBLICATIONS

European partial supplementary search report for EP application No. 19740841.2 dated Jan. 22, 2021. (70 pages).
China first office action with English Translation for CN Application 201810050134.2 dated Dec. 4, 2019. (15 pages).
Extended European Search Report for EP Application 19740841.2 dated May 10, 2021. (14 pages).
Indian Examination Report for IN Application 202017027997 dated Sep. 15, 2021. (6 pages).

* cited by examiner

METHOD FOR REPORTING DATA AND RELATED PRODUCTS

CROSS-REFERENCE TO RELATED APPLICATION(S)

This application is a continuation of International Application No. PCT/CN2019/071550, filed on Jan. 14, 2019, which claims priority to Chinese Patent Application No. 201810050134.2, filed on Jan. 18, 2018, the disclosures of both of which are hereby incorporated by reference in their entireties.

TECHNICAL FIELD

This disclosure relates to the technical field of electronic devices, and particularly to a method for reporting data and related products.

BACKGROUND

With the popularity of electronic devices such as mobile phones, tablets, etc., the electronic devices can support an increasing number of applications and have powerful functions. The electronic device is developing in a diversified and personalized way and becoming an indispensable electronic product in daily life. However, the electronic device consumes a lot of power during a fall process.

SUMMARY

In a first aspect of the disclosure, an electronic device is provided. The electronic device includes a timer, a fall detection sensor, a processor coupled with the timer and the fall detection sensor, and a communication module coupled with the processor. The timer is configured to record a continuous weightlessness duration of the electronic device when the electronic device is in a weightlessness state. The fall detection sensor is configured to collect falling data of the electronic device in real time when the electronic device is in the weightlessness state. The processor is configured to obtain falling data from the fall detection sensor when the continuous weightlessness duration is longer than a preset duration. The communication module is configured to report the falling data obtained by the processor to a preset device.

In a second aspect of the disclosure, a method for reporting data is provided. The method is applicable to an electronic device and includes the following. When the electronic device is in a weightlessness state, a timer of the electronic device records a continuous weightlessness duration of the electronic device. When the electronic device is in the weightlessness state, a fall detection sensor of the electronic device collects falling data of the electronic device in real time. When the continuous weightlessness duration is longer than a preset duration, a processor of the electronic device coupled with the timer and the fall detection sensor obtains falling data from the fall detection sensor. A communication module of the electronic device coupled with the processor reports the falling data obtained by the processor to a preset device.

In a third aspect of the disclosure, a non-transitory computer readable storage medium is provided. The non-transitory computer readable storage medium stores computer programs which, when executed by a processor of an electronic device, cause the processor to: record a continuous weightlessness duration of the electronic device when the electronic device is in a weightlessness state; collect falling data of the electronic device in real time when the electronic device is in the weightlessness state; obtain falling data from the collected falling data when the continuous weightlessness duration is longer than a preset duration; and report the obtained falling data to a preset device.

BRIEF DESCRIPTION OF THE DRAWINGS

In order to describe technical solutions of implementations or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

DETAILED DESCRIPTION

In order for those skilled in the art to better understand technical solutions of the disclosure, technical solutions of implementations will be described clearly and completely with reference to accompanying drawings in the implementations. Apparently, implementations described hereinafter are merely some implementations, rather than all implementations, of the disclosure. All other implementations obtained by those of ordinary skill in the art based on the implementations without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

"Electronic device" in implementations of the disclosure may include various handheld devices with wireless communication functions, on-board devices, wearable devices, computing devices or other processing devices connected to a wireless modem, as well as various forms of user equipment (UE), mobile stations (MS), terminal device, etc. For convenience of description, the above-mentioned devices are collectively referred to as electronic devices. The electronic device of implementations of the disclosure may be equipped with some peripheral accessories, such as a screen protection film, a protection cover, and the like. The electronic device of implementations of the disclosure at least includes a processor, a timer coupled with the processor, a fall detection sensor coupled with the processor, and a communication module coupled with the processor. The fall detection sensor may include at least one of an acceleration sensor, a distance measurement sensor, and a wind speed and wind direction sensor, camera, etc. The camera may be at least one of an infrared camera and a visible light camera. The camera may also be a dual camera. According to a position where the camera is disposed, the camera may be a front camera, a rear camera, a side camera, or the like. The timer is configured to realize a timing function. The communication module is configured to communicate with other devices. The processor may be integrated with a Sensor Hub module, or the electronic device may include a Sensor Hub module. The processor may control the Sensor Hub module to implement the following implementations of the disclosure.

Hereinafter, implementations of the disclosure will be described in detail.

According to implementations of the disclosure, an electronic device is provided. The electronic device includes a timer, a fall detection sensor, a processor coupled with the timer and the fall detection sensor, and a communication module coupled with the processor. The timer is configured to record a continuous weightlessness duration of the electronic device when the electronic device is in a weightlessness state. The fall detection sensor is configured to collect falling data of the electronic device in real time when the electronic device is in the weightlessness state. The processor is configured to obtain falling data from the fall detection sensor when the continuous weightlessness duration is longer than a preset duration. The communication module is configured to report the falling data obtained by the processor to a preset device.

According to implementations of the disclosure, a method for reporting data in an electronic device is provided. The method includes the following. When the electronic device is in a weightlessness state, a timer of the electronic device records a continuous weightlessness duration of the electronic device. When the electronic device is in the weightlessness state, a fall detection sensor of the electronic device collects falling data of the electronic device in real time. When the continuous weightlessness duration is longer than a preset duration, a processor of the electronic device coupled with the timer and the fall detection sensor obtains falling data from the fall detection sensor. A communication module of the electronic device coupled with the processor reports the falling data obtained by the processor to a preset device.

According to implementations of the disclosure, a non-transitory computer readable storage medium is provided. The non-transitory computer readable storage medium stores computer programs which, when executed by a processor of an electronic device, cause the processor to: record a continuous weightlessness duration of the electronic device when the electronic device is in a weightlessness state; collect falling data of the electronic device in real time when the electronic device is in the weightlessness state; obtain falling data from the collected falling data when the continuous weightlessness duration is longer than a preset duration; and report the obtained falling data to a preset device.

Figure 1:
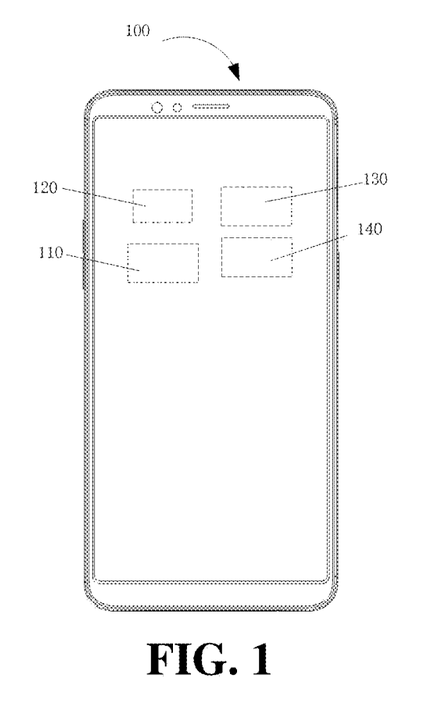
FIG. 1 is a schematic structural diagram illustrating an example electronic device according to implementations.

FIG. 1 is a schematic structural diagram illustrating an electronic device 100 according to implementations. As illustrated in FIG. 1, the electronic device 100 includes a processor 110, a timer 120, a fall detection sensor 130, and a communication module 140. The timer 120, the fall detection sensor 130, and the communication module 140 are all electrically coupled with the processor 110. The timer 120 is configured to record a continuous weightlessness duration of the electronic device when the electronic device is in a weightlessness state. The processor 110 is configured to obtain falling data of the electronic device collected by the fall detection sensor 130 when the continuous weightlessness duration is longer than a preset duration. The communication module 140 is configured to transmit the falling data to a preset device.

As can be seen, according to the electronic device of the implementation of the disclosure, when the electronic device is in the weightlessness state, the continuous weightlessness duration of the electronic device can be recorded. When the continuous weightlessness duration is longer than the preset duration, the falling data of the electronic device can be obtained. The falling data is transmitted to the preset device. Continuous fall indicates a relatively high falling height, where the electronic device may be damaged. The electronic device only reports data when the continuous weightlessness duration is longer than the preset duration, which can not only reduce power consumption of the electronic device, but also achieve reporting of effective falling data. The effective falling data is obtained and reported when the electronic device is considered to be damaged due to falling.

In one implementation, the processor 110 configured to obtain the falling data of the electronic device collected by the fall detection sensor 130 is configured to: determine a duration from a current time point to a time point when the electronic device falls to the ground; determine sample intervals according to the duration; and obtain multiple sets of sample data by sampling data according to the sample intervals, to construct the falling data.

In one implementation, the processor 110 is further configured to: estimate a force between the electronic device and the ground; obtain a falling angle of the electronic device, and determine, according to the falling angle, hardware of the electronic device that first touches the ground; determine a force threshold corresponding to the hardware; and obtain the falling data of the electronic device when the force is greater than the force threshold.

In one implementation, the processor 110 configured to estimate the force between the electronic device and the ground is configured to: determine the material of the ground, a current falling speed, and a current falling height; determine a buffer duration corresponding to the material of the ground; determine, according to the current falling speed and the current falling height, a final falling speed of the electronic device at which the electronic device falls to the ground; and determine the force between the electronic device and the ground according to the final falling speed, the buffer duration, and momentum theorem.

In one implementation, the processor 110 is further configured to: obtain an acceleration curve of the electronic device corresponding to a preset time period, where the preset time period is a continuous period from a start time point of weightlessness of the electronic device to an end time point of the continuous weightlessness duration; and obtain the falling data of the electronic device collected by the fall detection sensor, when the continuous weightlessness duration is longer than the preset duration and the acceleration curve satisfies a preset condition.

The electronic device may also include a memory. The processor is a control center of the electronic device. The processor uses various interfaces and lines to connect various parts of the entire electronic device. The processor runs or executes software programs and/or modules stored in the memory and calls data stored in the memory, to perform various functions of the electronic device and process data, thereby monitoring the electronic device. In one implementation, the processor integrates an application processor and a modem processor, where the application processor mainly handles an operating system, a user interface, application programs, and so on, and the modem processor mainly handles wireless communication. It will be appreciated that the above-mentioned modem processor may not be integrated into the processor.

The electronic device described in conjunction with FIG. 1 can be configured to perform a method for reporting date. The method includes the following. When the electronic device is in a weightlessness state, the timer 120 records a continuous weightlessness duration of the electronic device. When the continuous weightlessness duration is longer than a preset duration, the processor 110 obtains falling data of the electronic device collected by the fall detection sensor 130. The communication module 140 transmits the falling data to a preset device.

Figure 2A:
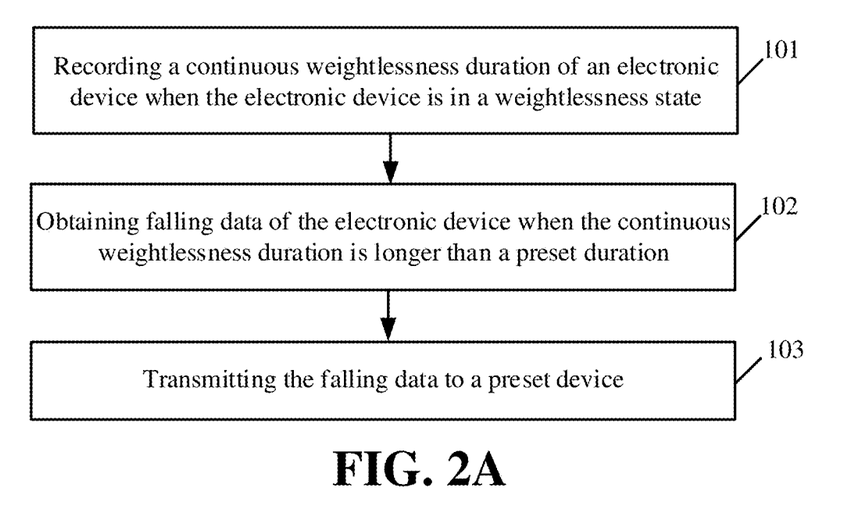
FIG. 2A is a schematic flowchart illustrating a method for reporting data according to implementations.

FIG. 2A is a schematic flowchart illustrating a method for reporting data according to implementations. The method is applicable to an electronic device. Based on the electronic device described in conjunction with FIG. 1, the electronic device includes a processor, a timer coupled with the processor, a fall detection sensor coupled with the processor, and a communication module coupled with the processor. The method includes the following.

At block 101, when the electronic device is in a weightlessness state, a continuous weightlessness duration of the electronic device is recorded.

When the electronic device is in the weightlessness state, the continuous weightlessness duration can be recorded with the timer of the electronic device. If the continuous weightlessness duration is relatively short, it indicates that a falling height of the electronic device is relatively low or a user carrying the electronic device is in a motion state, here, it is unlikely to cause damage to the electronic device. Considering the above, the continuous weightlessness duration of the electronic device is recorded in the disclosure.

In one implementation, when the electronic device is in the weightlessness state, whether the electronic device is in a state of free fall is detected. Upon detecting that the electronic device is in the state of free fall, the process can proceed to record the continuous weightlessness duration of the electronic device. Free fall is a special case of weightlessness. When the electronic device is in the state of free fall, possibility of damage to the electronic device is relatively high. Therefore, the continuous weightlessness duration of the electronic device is recorded upon detecting that the electronic device is in the state of free fall.

At block 102, when the continuous weightlessness duration is longer than a preset duration, falling data of the electronic device is obtained.

The preset duration herein may be set by a user, or may be set by default. If the continuous weightlessness duration of the electronic device is longer than the preset duration, it indicates that the falling height of the electronic device is relatively high, here, it is very likely to cause damage to the electronic device. Therefore, the falling data of the electronic device is obtained. If the continuous weightlessness duration is shorter than or equal to the preset duration, it indicates that the risk of the electronic device being damaged due to falling is relatively small. Therefore, it is not necessary to obtain the falling data of the electronic device.

In one implementation, the above-mentioned falling data may include at least one of: falling time points, falling positions, a falling angle, an operating state of the electronic device before falling, a posture in which the electronic device is held by the user before falling, falling speeds, the material of the ground, and the like. The falling time point may be recorded by a system clock of the electronic device. The falling position may be obtained by positioning of the electronic device. The falling position may also be obtained by using an environment image, which is obtained by taking an image of the environment with a camera. The falling angle, the falling speed, and material of the ground can be detected by a fall detection sensor. The operating state of the electronic device before falling may include at least one of a screen-off/screen-on state, an application running in the foreground, CPU load of the electronic device, electric quantity of the electronic device, and so on. The posture in which the electronic device is held by the user before falling may be a posture of holding the electronic device before falling. As an example, the electronic device is provided with a pressure sensor in the body thereof to detect the posture in which the electronic device is held by the user.

In one implementation, the operation of obtaining the falling data of the electronic device at block 102 is as follows. At 21, a duration from a current time point to a time point when the electronic device falls to the ground is determined. At 22, sample intervals are determined according to the duration. At 23, multiple sets of sample data are obtained by sampling data according to the sample intervals, to construct the falling data.

The current time point herein may be a time point at which the continuous weightlessness duration is longer than the preset duration. As an example, a height between the electronic device and the ground is obtained through a distance measurement sensor of the electronic device. A current falling speed is also obtained. Then a time point at which the electronic device falls to the ground can be calculated according to a free fall formula. Accordingly, a duration from a current time point to the time point at which the electronic device falls to the ground can be obtained. Multiple sample intervals can be determined according to the duration. In this way, different from continuously collecting falling data, falling data corresponding to different time points can be collected, which can reduce the amount of data processing, thereby reducing power consumption. In addition, characteristics of continuous fall of the electronic device can be simulated with small amount of data obtained in the above manner. Data sampling can be performed according to the sample intervals to obtain multiple sets of sample data, and the multiple sets of sample data can be used to construct the falling data.

In one implementation, the method further includes the following prior to the operation at block 102 after the operation at block 101. At A1, a force between the electronic device and the ground is estimated. At A2, a falling angle of the electronic device is obtained, and hardware of the electronic device that first touches the ground is determined according to the falling angle. At A3, a force threshold corresponding to the hardware is determined. At A4, when the force is greater than the force threshold, the process can proceed to obtain the falling data of the electronic device.

Considering that the electronic device receives different buffer forces from different types of grounds when the electronic device falls to the ground, the force between the electronic device and the ground can be estimated according to the material of the ground and a (final) falling speed of the terminal device. The falling angle of the electronic device can be detected by the fall detection sensor. Hardware of the electronic device that first touches the ground varies with different falling angles of the electronic device. In one implementation, a mapping relationship between falling angles and hardware that first touches the ground can be set in advance, where the mapping relationship can be obtained based on a large number of experiments. A threshold of a force (force threshold for short) that one hardware can withstand varies with different hardware of the electronic device. For instance, a force threshold corresponding to a screen when the screen falls to the ground is different from a force threshold corresponding to a rear cover when the rear cover falls to the ground. It can be understood that, if the force between the electronic device and the ground exceeds the force threshold, the electronic device is very likely to be damaged; on the other hand, if the force between the electronic device and the ground is smaller than the force threshold, the electronic device is relatively safe. A mapping relationship between hardware and force thresholds can be stored in the memory of the electronic device in advance. The force threshold corresponding to the hardware that first touches the ground can be obtained according to the mapping relationship. If the force is greater than the force threshold, the electronic device is very likely to be damaged, therefore, the falling data of the electronic device can be obtained in this situation.

In one implementation, the hardware may be one of a screen, a rear cover, a housing, a camera, and the like, which is not limited herein.

In one implementation, the operation of estimating the force between the electronic device and the ground at A1 is as follows. At A11, the material of the ground, a current falling speed, and a current falling height are determined. At A12, a buffer duration corresponding to the material of the ground is determined. At A13, a final falling speed of the electronic device when the electronic device falls to the ground is determined according to the current falling speed and the current falling height. At A14, the force between the electronic device and the ground is determined according to the final falling speed, the buffer duration, and momentum theorem.

Different ground materials (i.e., the material of the ground) correspond to different buffer durations. A mapping relationship between ground materials and buffer durations can be set in advance. The material of the ground can be detected by a camera, and a buffer duration that corresponds to the material of the ground can be determined according to the mapping relationship. When the current falling speed and the current falling height are known, the final falling speed of the electronic device when the electronic device falls to the ground can be obtained according to a free fall formula, then the force between the electronic device and the ground can be obtained according to momentum theorem. The momentum theorem can be: $mv=ft$, where m represents the mass of the electronic device and m is known (i.e., the mass of the electronic device), v represents the final falling speed, t represents the buffer duration, and f represents the force between the electronic device and the ground.

At block 103, the falling data is transmitted (reported) to a preset device.

The preset device may be a memory of the electronic device, a server, or other devices associated with the electronic device.

In one implementation, the falling data is transmitted to the preset device before the electronic device falls to the ground.

In one implementation, the falling data is transmitted to the preset device after the electronic device falls to the ground.

In one implementation, the operation of transmitting the falling data to the preset device at block 103 includes the following. The falling data is compressed. The compressed falling data is transmitted to the preset device.

The electronic device may first compress the falling data. After compression, the size of the falling data changes. Then the falling data is transmitted to the preset device. In this way, not only power consumption of the electronic device can be reduced, but also fast data transmission can be achieved.

Taking a mobile phone as an example, the mobile phone often falls during usage. For example, the mobile phone falls from the user's hand to the ground. Existing mobile phones report all fall events to a server, for example, the mobile phone reports the falling data once the mobile phone is detected to be in a weightlessness state. In fact, some falls will not cause damage to the mobile phone, or some weightlessness is caused by user's motion, this will also cause the mobile phone to lose weight. Therefore, frequent reporting of falling data increases power consumption of the mobile phone. By adopting technical schemes of implementations of the disclosure, reporting of effective falling data can be achieved (where the effective falling data is obtained and reported when the electronic device is considered to be damaged due to falling) with low power consumption of the electronic device.

Figure 2B:
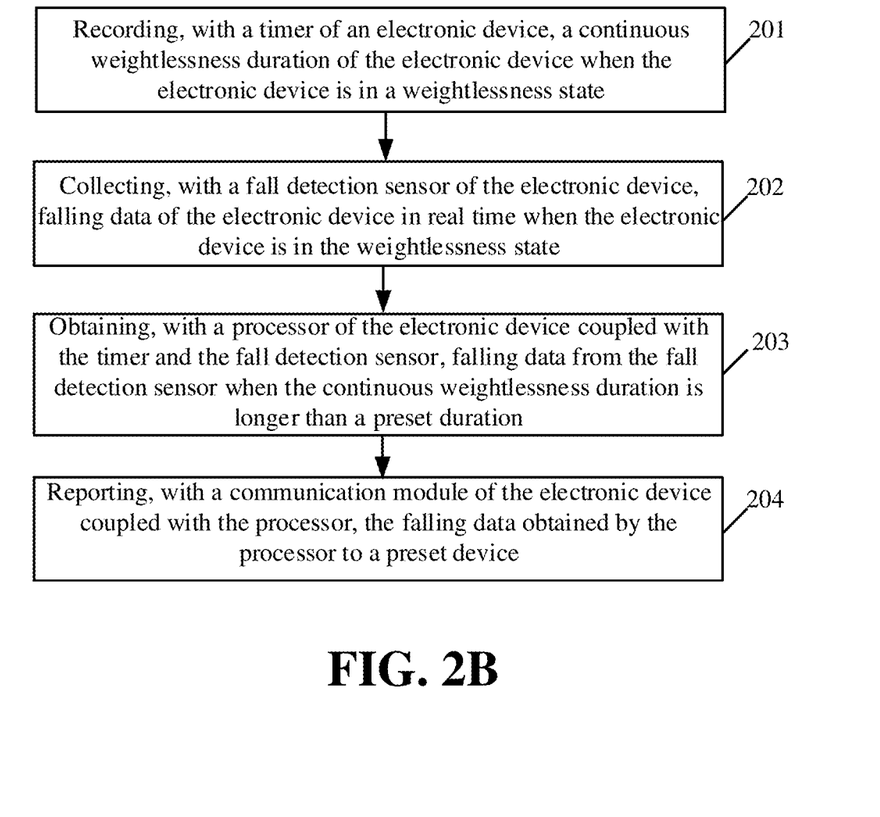
FIG. 2B is a schematic flowchart illustrating a method for reporting data according to other implementations.

Similar to foregoing implementations, FIG. 2B is a schematic flowchart illustrating a method for reporting data according to implementations. The method is applicable to an electronic device. Based on the electronic device described in conjunction with FIG. 1, the method for reporting data described in this implementation includes the following.

At block 201, when the electronic device is in a weightlessness state, a timer of the electronic device records a continuous weightlessness duration of the electronic device.

At block 202, when the electronic device is in the weightlessness state, a fall detection sensor of the electronic device collects falling data of the electronic device in real time.

At block 203, when the continuous weightlessness duration is longer than a preset duration, a processor of the electronic device coupled with the timer and the fall detection sensor obtains falling data from the fall detection sensor.

At block 204, a communication module of the electronic device coupled with the processor reports the falling data obtained by the processor to a preset device.

In one implementation, the method further includes the following. A duration from a time point at which the continuous weightlessness duration becomes longer than the preset duration to a time point when the electronic device falls to the ground is determined. Sample intervals are determined according to the duration. A plurality of sets of sample data by sampling the falling data collected by the fall detection sensor are collected according to the sample intervals, to construct the falling data to be reported.

In one implementation, the method further includes the following. A force between the electronic device and the ground is estimated. A falling angle of the electronic device is obtained. Hardware of the electronic device that first touches the ground is determined according to the falling angle. A force threshold corresponding to the hardware is determined. The process can proceed to the obtaining of the falling data when the force is greater than the force threshold.

In one implementation, the force between the electronic device and the ground is estimated as follows. The material of the ground, a falling speed when the continuous weightlessness duration becomes longer than the preset duration, and a falling height with respect to the ground when the continuous weightlessness duration becomes longer than the preset duration are determined. A buffer duration corresponding to the material of the ground is determined. A final falling speed of the electronic device at which the electronic device falls to the ground is determined according to the falling speed and the falling height. The force between the electronic device and the ground is determined according to the final falling speed, the buffer duration, and momentum theorem.

In one implementation, the method further includes the following. An acceleration curve of the electronic device corresponding to a preset time period is obtained, where the preset time period is a continuous period from a start time point of weightlessness of the electronic device to an end time point of the continuous weightlessness duration. Whether the acceleration curve satisfies a preset condition is determined. The process can proceed to the obtaining of the falling data when the acceleration curve satisfies the preset condition.

In one implementation, whether the acceleration curve satisfies the preset condition is determined as follows. An average value of acceleration is determined. Whether the average value of the acceleration is within a first preset range is determined. Upon determining that the average value of the acceleration is within the first preset range, determine that the acceleration curve satisfies the preset condition.

In one implementation, whether the acceleration curve satisfies the preset condition is determined as follows. The maximum acceleration and the minimum acceleration are determined. Whether the maximum acceleration and the minimum acceleration are within a second preset range is determined. Upon determining that the maximum acceleration and the minimum acceleration are within the second preset range, determine that the acceleration curve satisfies the preset condition.

For details of the operations at blocks 201 to 204, reference may be made to the related descriptions in the foregoing method for reporting data, which will not be described in further detail herein.

As can be seen, according to the method for reporting data of the implementations of the disclosure, when the electronic device is in the weightlessness state, the continuous weightlessness duration of the electronic device can be recorded. When the continuous weightlessness duration is longer than the preset duration, the falling data of the electronic device can be obtained. The falling data is transmitted to the preset device. Continuous fall indicates a relatively high falling height. In this case, the electronic device may be damaged. The electronic device only reports data when the continuous weightlessness duration is longer than the preset duration, which can not only reduce power consumption of the electronic device, but also achieve reporting of effective falling data (where the effective falling data is obtained and reported when the electronic device is considered to be damaged due to falling).

Figure 2C:
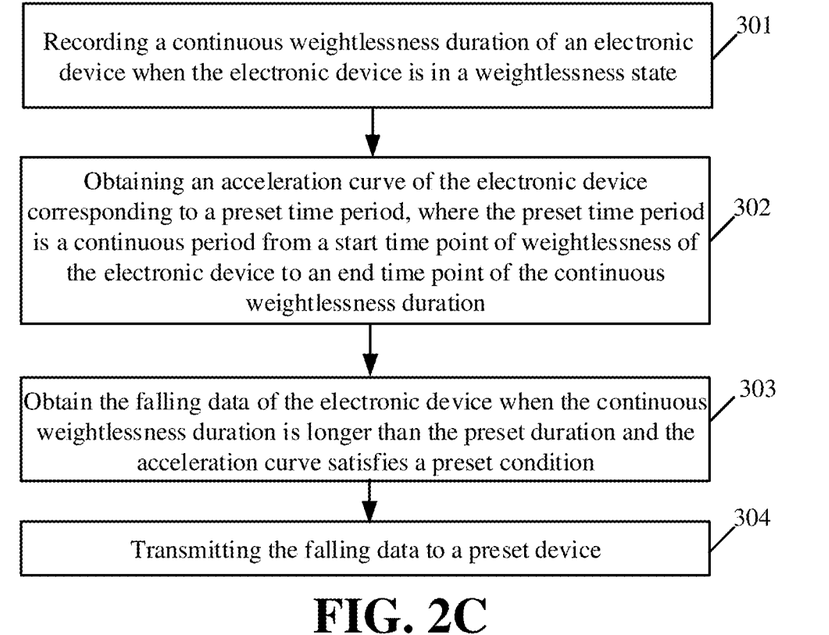
FIG. 2C is a schematic flowchart illustrating a method for reporting data according to other implementations.

Similar to foregoing implementations, FIG. 2C is a schematic flowchart illustrating a method for reporting data according to implementations. The method for reporting data described in this implementation includes the following.

At block 301, when an electronic device is in a weightlessness state, a continuous weightlessness duration of the electronic device is recorded.

At block 302, an acceleration curve of the electronic device corresponding to a preset time period is obtained, where the preset time period is a continuous period from a start time point of weightlessness of the electronic device to an end time point of the continuous weightlessness duration.

A preset condition described below and the preset time period mentioned above may be set by a user, or may be set by default. In addition, the preset time period is a continuous period from a start time point of weightlessness of the electronic device to and an end time point of the continuous weightlessness duration. As an example, the acceleration curve of the electronic device is obtained from the fall detection sensor. An average value of acceleration is then determined and whether the average value of the acceleration is within a first preset range is determined. If the average value of the acceleration is within the first preset range, the acceleration curve is determined to be satisfy the preset condition. As another example, the maximum acceleration and the minimum acceleration are determined and whether the maximum acceleration and the minimum acceleration are within a second preset range is determined. If the maximum acceleration and the minimum acceleration are within the second preset range, the acceleration curve is determined to satisfy the preset condition. The first preset range and the second preset range may be set by the user, or may be set by default. In general, gravity acceleration $g=9.81$ m/s$^2$. For different latitudes and longitudes, the gravity acceleration is slightly changed. Even under wind resistance, the gravity acceleration will remain in a constant range.

In one implementation, when the acceleration curve does not satisfy the preset condition, the fall event will not be reported. In some cases, for example, the electronic device has acceleration when the user is in a motion state, here, the electronic device will not be damaged even though it is in the weightlessness state.

At block 303, when the continuous weightlessness duration is longer than the preset duration and the acceleration curve satisfies a preset condition, falling data of the electronic device is obtained.

If the acceleration curve satisfies the preset condition, it means that the electronic device is in a state of free fall, where the electronic device is very likely to be damaged, therefore, the falling data of the electronic device is obtained.

At block 304, the falling data is transmitted to a preset device.

For details of the operations at block 301, block 302, and block 303, reference may be made to the related descriptions in the foregoing method for reporting data, which will not be described in further detail herein.

As can be seen, according to the method for reporting data of the implementations of the disclosure, when the electronic device is in the weightlessness state, the continuous weightlessness duration of the electronic device can be recorded. The acceleration curve of the electronic device corresponding to the preset time period can be obtained, where the preset time period is a continuous period from a start time point of weightlessness of the electronic device to an end time point of the continuous weightlessness duration. When the acceleration curve satisfies the preset condition and when the continuous weightlessness duration is longer than the preset duration, the falling data of the electronic device can be obtained. The falling data is transmitted to the preset device. Continuous fall indicates a relatively high falling height. In this case, the electronic device may be damaged. The electronic device only reports data when the continuous weightlessness duration is longer than the preset duration, which can not only reduce power consumption of the electronic device, but also achieve reporting of effective falling data (where the effective falling data is falling data reported when the electronic device is considered to have a great risk of being damaged due to falling).

Similar to foregoing implementations, a device configured to implement the foregoing method for reporting data is provided, the following will give a detailed description.

Figure 3:
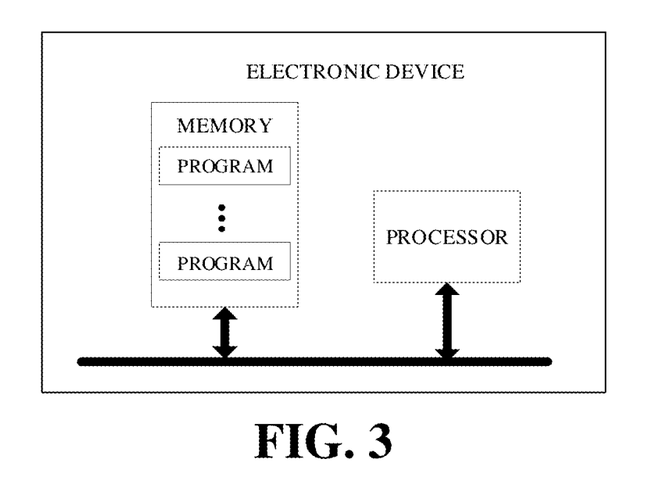
FIG. 3 is a schematic structural diagram illustrating an electronic device according to other implementations.

Similar to foregoing implementations, FIG. 3 illustrates an electronic device according to implementations. As illustrated in FIG. 3, the electronic device includes a processor, a memory, and one or more programs stored in the memory and configured to be executed by the processor. In one implementation, the electronic device further includes a timer coupled with the processor, a fall detection sensor coupled with the processor, and a communication module coupled with the processor. The one or more programs include instructions which, when executed by the processor, are operable with the processor to carry out following actions. When the electronic device is in a weightlessness state, a continuous weightlessness duration of the electronic device is recorded. When the continuous weightlessness duration is longer than a preset duration, falling data of the electronic device is obtained. The falling data is transmitted to a preset device.

In one implementation, in terms of obtaining the falling data of the electronic device, the one or more programs include instructions which, when executed by the processor, are operable with the processor to carry out following actions. A duration from a current time point to a time point when the electronic device falls to the ground is determined. Sample intervals are determined according to the duration. Multiple sets of sample data are obtained by sampling data according to the sample intervals, to construct the falling data.

In one implementation, the one or more programs further include instructions which, when executed by the processor, are operable with the processor to carry out following actions. A force between the electronic device and the ground is estimated. A falling angle of the electronic device is obtained. Hardware of the electronic device that first touches the ground is determined according to the falling angle. A force threshold corresponding to the hardware is determined. When the force is greater than the force threshold, the falling data of the electronic device is obtained.

In one implementation, in terms of estimating the force between the electronic device and the ground, the one or more programs include instructions which, when executed by the processor, are operable with the processor to carry out following actions. The material of the ground, a current falling speed, and a current falling height are determined. A buffer duration corresponding to the material of the ground is determined. A final falling speed of the electronic device when the electronic device falls to the ground is determined according to the current falling speed and the current falling height. The force between the electronic device and the ground is determined according to the final falling speed, the buffer duration, and momentum theorem.

In one implementation, the one or more programs further include instructions which, when executed by the processor, are operable with the processor to carry out following actions. An acceleration curve of the electronic device corresponding to a preset time period is obtained, where the preset time period is a continuous period from a start time point of weightlessness of the electronic device to an end time point of the continuous weightlessness duration. When the continuous weightlessness duration is longer than the preset duration and the acceleration curve satisfies a preset condition, the falling data of the electronic device is obtained.

Figure 4A:
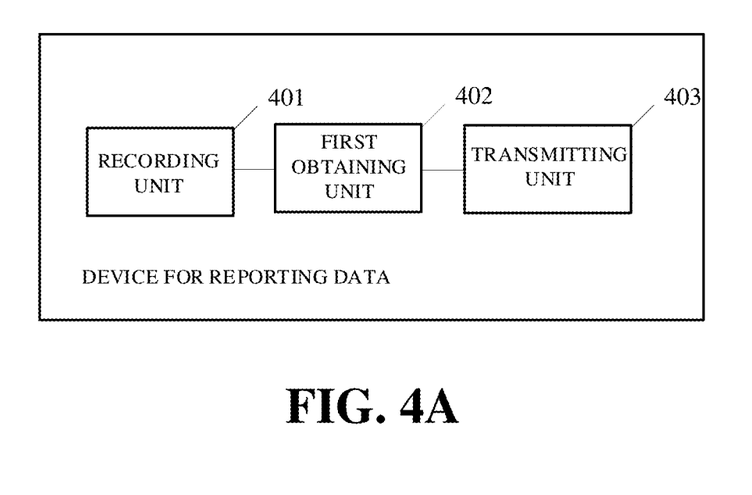
FIG. 4A is a schematic structural diagram illustrating a device for reporting data according to implementations.

FIG. 4A is a schematic structural diagram illustrating a device for reporting data according to implementations. The device for reporting data is applicable to an electronic device including a processor, a timer coupled with the processor, a fall detection sensor coupled with the processor, and a communication module coupled with the processor. As illustrated in FIG. 4A, the device for reporting data includes a recording unit 401, a first obtaining unit 402, and a transmitting unit 403. The recording unit 401 is configured to record a continuous weightlessness duration of the electronic device when the electronic device is in a weightlessness state. The first obtaining unit 402 is configured to obtain falling data of the electronic device when the continuous weightlessness duration is longer than a preset duration. The transmitting unit 403 is configured to transmit the falling data to a preset device.

Figure 4B:
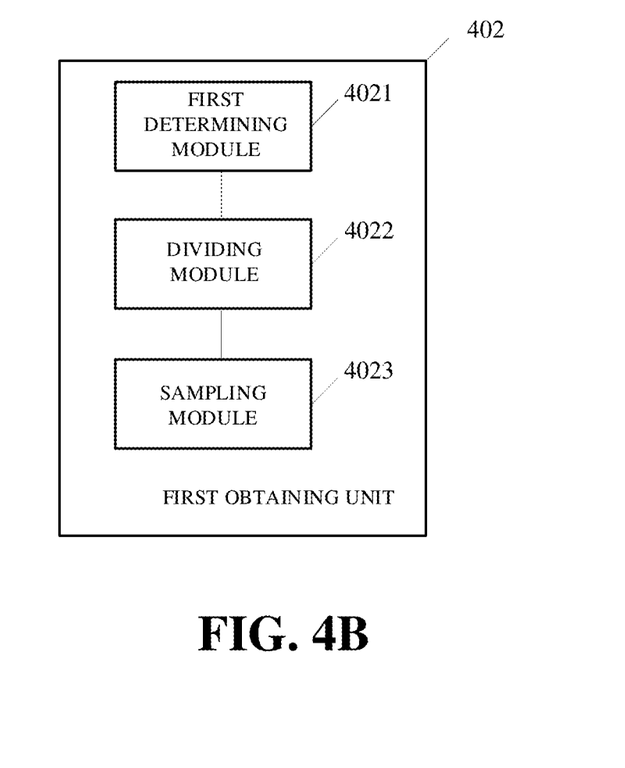
FIG. 4B is a schematic structural diagram illustrating a first obtaining unit of the device for reporting data illustrated in FIG. 4A according to implementations.

In one implementation, FIG. 4B is a detailed structure illustrating the first obtaining unit 402 of the device for reporting data illustrated in FIG. 4A according to implementations. As illustrated in FIG. 4B, the first obtaining unit 402 includes a first determining module 4021, a dividing module 4022, and a sampling module 4023. The first determining module 4021 is configured to determine a duration from a current time point to a time point when the electronic device falls to the ground. The dividing module 4022 is configured to determine sample intervals according to the duration. The sampling module 4023 is configured to obtain multiple sets of sample data by sampling data according to the sample intervals, to construct the falling data.

Figure 4C:
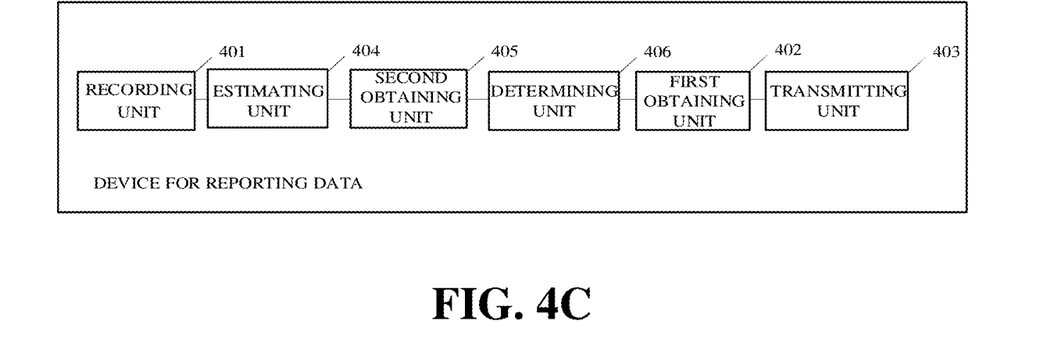
FIG. 4C is another schematic structural diagram illustrating the device for reporting data illustrated in FIG. 4A according to other implementations.

In one implementation, FIG. 4C illustrates a modification of the device for reporting data described in conjunction with FIG. 4A according to implementations. Compared with FIG. 4A, the device for reporting data illustrated in FIG. 4C further include an estimating unit 404, a second obtaining unit 405, and a determining unit 406. The estimating unit 404 is configured to estimate a force between the electronic device and the ground. The second obtaining unit 405 is configured to obtain a falling angle of the electronic device, and determine, according to the falling angle, hardware of the electronic device that first touches the ground. The determining unit 406 is configured to determine a force threshold corresponding to the hardware. The first obtaining unit 402 is configured to obtain the falling data of the electronic device when the force is greater than the force threshold.

Figure 4D:
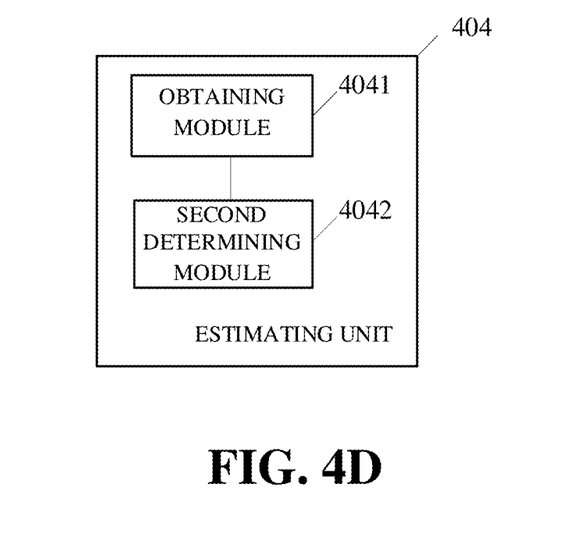
FIG. 4D is a schematic structural diagram illustrating an estimating unit of the device for reporting data illustrated in FIG. 4C according to implementations.

In one implementation, FIG. 4D is a detailed structure illustrating the estimating unit 404 of the device for reporting data illustrated in FIG. 4C according to implementations. As illustrated in FIG. 4D, the estimating unit 404 includes an obtaining module 4041 and a second determining module 4042. The obtaining module 4041 is configured to determine the material of the ground, a current falling speed, and a current falling height. The second determining module 4042 is configured to determine a buffer duration corresponding to the material of the ground. The second determining module 4042 is configured to determine, according to the current falling speed and the current falling height, a final falling speed of the electronic device at which the electronic device reaches the ground. The second determining module 4042 is configured to determine the force between the electronic device and the ground according to the final falling speed, the buffer duration, and momentum theorem.

Figure 4E:
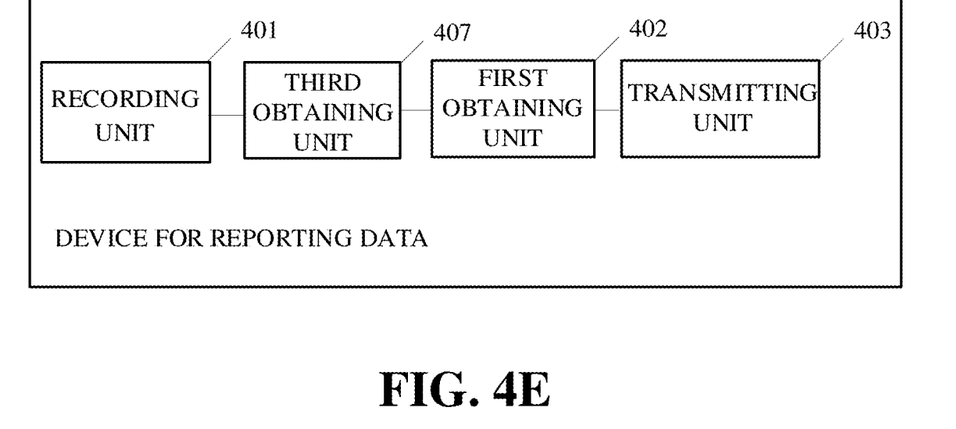
FIG. 4E is another schematic structural diagram illustrating the device for reporting data illustrated in FIG. 4A according to other implementations.

In one implementation, FIG. 4E illustrates a modification of the device for reporting data described in conjunction with FIG. 4A according to implementations. Compared with FIG. 4A, the device for reporting data illustrated in FIG. 4E further include a third obtaining unit 407. The third obtaining unit 407 is configured to obtain an acceleration change curve of the electronic device within a preset time period, where the preset time period is a continuous time period from a start time point of weightlessness of the electronic device to an end time point of the continuous weightlessness duration. The first obtaining unit 402 is configured to obtain the falling data of the electronic device when the continuous weightlessness duration is longer than the preset duration and the acceleration curve satisfies a preset condition.

As can be seen, according to the device for reporting data of the implementations of the disclosure, when the electronic device is in the weightlessness state, the continuous weightlessness duration of the electronic device can be recorded. When the continuous weightlessness duration is longer than the preset duration, the falling data of the electronic device can be obtained. The falling data is transmitted to the preset device. Continuous fall indicates a relatively high falling height. In this case, the electronic device may be damaged. The electronic device only reports data when the continuous weightlessness duration is longer than the preset duration, which can not only reduce power consumption of the electronic device, but also achieve reporting of effective falling data (where the effective falling data is falling data reported when the electronic device is considered to have a great risk of being damaged due to falling).

It should be understood that, functions of program modules of the device for reporting data in this implementation can be implemented according to the method in the foregoing method implementations. For details, reference may be made to the related descriptions in the foregoing method implementations, and it will not be described in further detail herein.

Figure 5:
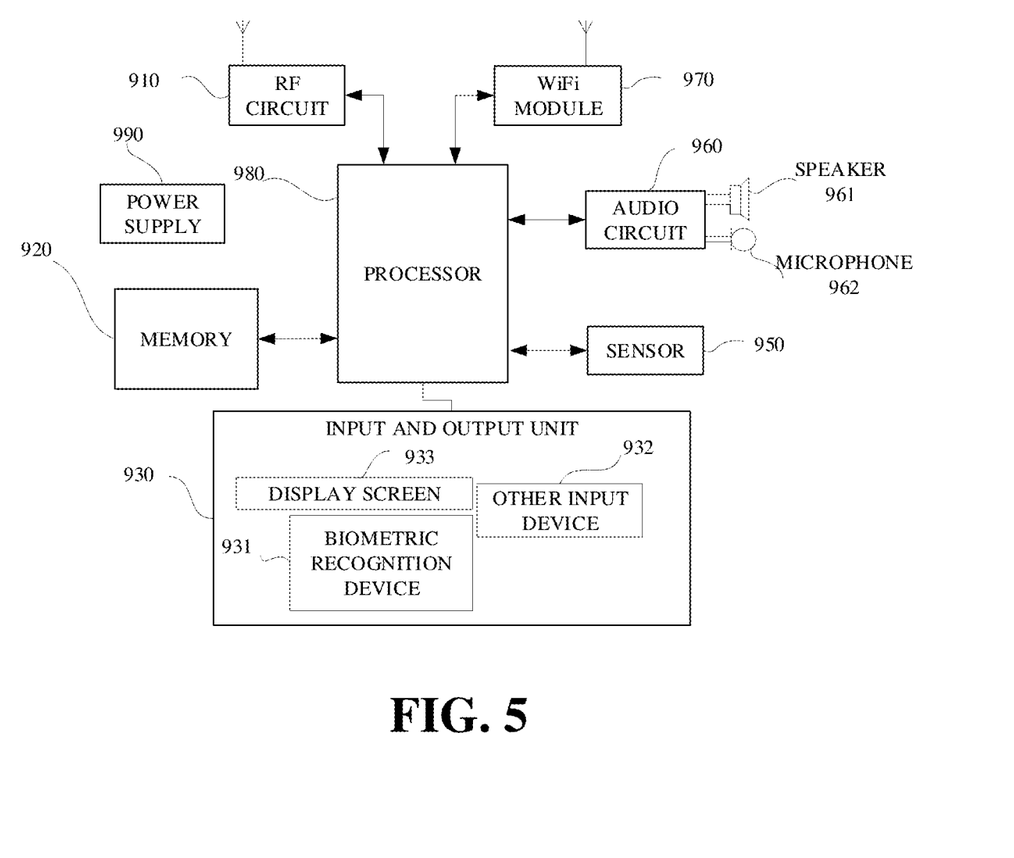
FIG. 5 is a schematic structural diagram illustrating an electronic device according to other implementations.

Implementations of the disclosure further provide another electronic device. As illustrated in FIG. 5, only parts related to the implementations of the disclosure are illustrated for ease of description. For technical details not described, reference may be made to the method implementations of the disclosure. The mobile terminal may be any terminal device, such as a mobile phone, a tablet computer, a personal digital assistant (PDA), a point of sale terminal (POS), an on-board computer, and the like. The following describes the mobile phone as an example of the electronic device.

FIG. 5 is a block diagram of a part of a structure of a mobile phone related to an electronic device of implementations of the disclosure. As illustrated in FIG. 5, the mobile phone includes a radio frequency (RF) circuit 910, a memory 920, an input and output unit 930, a sensor 950, an audio circuit 960, a wireless fidelity (Wi-Fi) module 970, a processor 980, a power supply 990, and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated, or may combine certain components or different components.

In the following, various components of the mobile phone will be described in detail with reference to FIG. 5.

The input and output unit 930 is configured to receive input digital or character information and generate key signal input associated with user setting and function control of the mobile phone. In one implementation, the input and output unit 930 may include a display screen 933, a biometric recognition device 931, and other input devices 932. The biometric recognition device 931 may be at least one of a face recognition device, a fingerprint recognition device, an iris recognition device, a vein recognition device, a brain wave recognition device, and the like. In one implementation, the input and output unit 930 may further include other input devices 932. In one implementation, the other input devices 932 may include, but not limit to, one or more of a physical key, a function key (such as a volume control key, a switch key, etc.), a trackball, a mouse, a joystick, and the like.

The processor 980 is configured to: record a continuous weightlessness duration of the electronic device when the electronic device is in a weightlessness state; obtain falling data of the electronic device collected by the fall detection sensor, when the continuous weightlessness duration is longer than a preset duration; and transmit the falling data to a preset device.

The processor 980 is a control center of the mobile phone. The processor 980 uses various interfaces and lines to connect various parts of the entire mobile phone. The processor 980 runs or executes software programs and/or modules stored in the memory 920, and calls data stored in the memory 920 to perform various functions of the mobile phone and process data, thereby monitoring the mobile phone. In one implementation, the processor 980 may include one or more processing units, and the processing unit may be an artificial intelligence chip or a quantum chip; for example, the processor 980 may integrate an application processor (e.g., a CPU or a GPU) and a modem processor, where the application processor mainly handles an operating system, a user interface, application programs, and so on, and the modem processor mainly handles wireless communication. It will be appreciated that the above-mentioned modem processor may not be integrated into the processor 980. The processor 980 may be integrated with a Sensor Hub module, or the electronic device may include a Sensor Hub module. The processor 980 may control the Sensor Hub module to implement the following implementations of the disclosure.

The memory 920 may include a high-speed random access memory (RAM), and may further include a non-volatile memory such as at least one disk storage device, a flash device, or other volatile solid storage devices.

The RF circuit 910 is configured to transmit or receive information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The mobile phone may further include at least one sensor 950. The sensor 950 may be a fall detection sensor. The fall detection sensor may include a light sensor, a motion sensor, and other sensors. In one implementation, the light sensor includes an ambient light sensor and a proximity sensor. The ambient light sensor can adjust the brightness of a touch display screen according to ambient lights. The proximity sensor can turn off the touch display screen and/or backlight when the mobile phone reaches nearby the ear. As a kind of motion sensor, an accelerometer sensor can detect the magnitude of acceleration in all directions (typically three axes) and when the mobile phone is stationary, the accelerometer sensor can detect the magnitude and direction of gravity; the accelerometer sensor can be used for mobile phone gesture-recognition related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, an infrared sensor, and other sensors, and it will not be repeated herein.

The audio circuit 960, a speaker 961, a microphone 962 may provide an audio interface between the user and the mobile phone. The audio circuit 960 may convert received audio data into electrical signals and transfer the electrical signals to the speaker 961; thereafter the speaker 961 converts the electrical signals into sound signals to output. On the other hand, the microphone 962 converts received sound signals into electrical signals, which will be received and converted into audio data by the audio circuit 960 to output. The audio data is then processed and transmitted by the processor 980 via a RF circuit 910 to another mobile phone for example, or, the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 5, it should be understood that the Wi-Fi module 970 is not essential to the mobile phone and can be omitted according to actual needs without departing from the essential nature of the disclosure.

The mobile phone also includes the power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may further include a camera, a Bluetooth module, etc., and the disclosure will not elaborate herein.

Operations of the method of the foregoing implementations described in conjunction with FIG. 2A to FIG. 2C can be implemented based on the structure of the mobile phone.

Functions of units of the foregoing implementations described in conjunction with FIG. 3 and FIG. 4A to FIG. 4E can be implemented based on the structure of the mobile phone.

According to implementations of the disclosure, a non-transitory computer readable storage medium is further provided. The non-transitory computer readable storage medium is configured to store computer programs which, when executed by a processor of an electronic device, cause the processor to execute part or all of the operations of any of the method for reporting data described in the foregoing method implementations.

According to implementations of the disclosure, a computer program product is further provided. The computer program product includes a non-transitory computer readable storage medium configured to store computer programs. The computer programs are operable with a computer to execute part or all of the operations of any of the method for reporting data described in the foregoing method implementations.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are illustrative implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the units is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to execute all or part of the operations described in the various implementations of the disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a ROM, a RAM, Disk or CD, and so on.

While the disclosure has been described in detail above with reference to the illustrative implementations, the scope of the disclosure is not limited thereto. As will occur to those skilled in the art, the disclosure is susceptible to various modifications and changes without departing from the spirit and principle of the disclosure. Therefore, the scope of the disclosure should be determined by the scope of the claims.

What is claimed is:

1. An electronic device, comprising:
    a timer configured to record a continuous weightlessness duration of the electronic device when the electronic device is in a weightlessness state;
    a fall detection sensor configured to collect falling data of the electronic device in real time when the electronic device is in the weightlessness state;
    a processor coupled with the timer and the fall detection sensor and configured to:
        estimate a force between the electronic device and the ground;
        obtain a falling angle of the electronic device, and determine, according to the falling angle, hardware of the electronic device that first touches the ground;
        determine a force threshold corresponding to the hardware; and
        obtain falling data to be reported from the fall detection sensor when the continuous weightlessness duration is longer than a preset duration and the force is greater than the force threshold; and
    a communication module coupled with the processor and configured to report the falling data obtained by the processor to a preset device.

2. The electronic device of claim 1, wherein the processor is further configured to:
    determine a duration from a time point at which the continuous weightlessness duration becomes longer than the preset duration to a time point when the electronic device falls to the ground;
    determine sample intervals according to the determined duration; and
    collect a plurality of sets of sample data by sampling the falling data collected by the fall detection sensor according to the sample intervals, to construct the falling data to be reported.

3. The electronic device of claim 1, wherein the processor is further configured to:
    determine the material of the ground, a falling speed when the continuous weightlessness duration becomes longer than the preset duration, and a falling height with respect to the ground when the continuous weightlessness duration becomes longer than the preset duration;
    determine a buffer duration corresponding to the material of the ground;
    determine, according to the falling speed and the falling height, a final falling speed of the electronic device at which the electronic device falls to the ground; and
    determine the force between the electronic device and the ground according to the final falling speed, the buffer duration, and momentum theorem.

4. The electronic device of claim 1, wherein the communication module configured to report the falling data obtained by the processor to the preset device is configured to:
    compress the falling data and transmit the compressed falling data to the preset device.

5. A method for reporting data in an electronic device, comprising:
    recording, with a timer of the electronic device, a continuous weightlessness duration of the electronic device when the electronic device is in a weightlessness state;
    collecting, with a fall detection sensor of the electronic device, falling data of the electronic device in real time when the electronic device is in the weightlessness state;
    obtaining, with a processor of the electronic device coupled with the timer and the fall detection sensor, an acceleration curve of the electronic device corresponding to a preset time period, wherein the preset time period is a continuous period from a start time point of weightlessness of the electronic device to an end time point of the continuous weightlessness duration;
    determining, with the processor, whether the acceleration curve satisfies a preset condition;
    obtaining, with the processor, falling data to be reported from the fall detection sensor when the continuous weightlessness duration is longer than a preset duration and the acceleration curve satisfies the preset condition; and
    reporting, with a communication module of the electronic device coupled with the processor, the falling data obtained by the processor to a preset device.

6. The method of claim 5, further comprising:
    determining a duration from a time point at which the continuous weightlessness duration becomes longer than the preset duration to a time point when the electronic device falls to the ground;
    determining sample intervals according to the determined duration; and collecting a plurality of sets of sample data by sampling the falling data collected by the fall detection sensor according to the sample intervals, to construct the falling data to be reported.

7. The method of claim 5, wherein determining whether the acceleration curve satisfies the preset condition comprises:
   determining an average value of acceleration;
   determining whether the average value of the acceleration is within a preset range; and
   determining that the acceleration curve satisfies the preset condition, upon determining that the average value of the acceleration is within the preset range.

8. The method of claim 5, wherein determining whether the acceleration curve satisfies the preset condition comprises:
   determining the maximum acceleration and the minimum acceleration;
   determining whether the maximum acceleration and the minimum acceleration are within a preset range; and
   determining that the acceleration curve satisfies the preset condition, upon determining that the maximum acceleration and the minimum acceleration are within the preset range.

9. A non-transitory computer readable storage medium storing computer programs which, when executed by a processor of an electronic device, cause the processor to:
   record a continuous weightlessness duration of the electronic device when the electronic device is in a weightlessness state;
   collect falling data of the electronic device in real time when the electronic device is in the weightlessness state;
   estimate a force between the electronic device and the ground;
   obtain a falling angle of the electronic device, and determine, according to the falling angle, hardware of the electronic device that first touches the ground;
   determine a force threshold corresponding to the hardware;
   obtain falling data to be reported from the collected falling data when the continuous weightlessness duration is longer than a preset duration and the force is greater than the force threshold; and
   report the obtained falling data to a preset device.

10. The non-transitory computer readable storage medium of claim 9, wherein the computer programs, when executed by the processor, further cause the processor to:
    determine a duration from a time point at which the continuous weightlessness duration becomes longer than the preset duration to a time point when the electronic device falls to the ground;
    determine sample intervals according to the determined duration; and
    collect a plurality of sets of sample data by sampling the collected falling data according to the sample intervals, to construct the falling data to be reported.

11. The non-transitory computer readable storage medium of claim 9, wherein the computer programs, when executed by the processor, further cause the processor to:
    determine the material of the ground, a falling speed when the continuous weightlessness duration becomes longer than the preset duration, and a falling height with respect to the ground when the continuous weightlessness duration becomes longer than the preset duration;
    determine a buffer duration corresponding to the material of the ground;
    determine, according to the falling speed and the falling height, a final falling speed of the electronic device at which the electronic device falls to the ground; and
    determine the force between the electronic device and the ground according to the final falling speed, the buffer duration, and momentum theorem.

* * * * *